United States Patent [19]

Schroeder et al.

[11] Patent Number: 5,844,339
[45] Date of Patent: *Dec. 1, 1998

[54] ACTIVE MAGNETIC BEARING WITH AUTO POSITION-DETECTION

[75] Inventors: Ulrich Schroeder, Mont St. Aignan; Maurice Brunet, Ste. Colombe près Bernon, both of France

[73] Assignee: Societe de Mecanique Magnetique, Saint Marcel, France

[ * ] Notice: This patent issued on a continued prosecution application filed under 37 CFR 1.53(d), and is subject to the twenty year patent term provisions of 35 U.S.C. 154(a)(2).

[21] Appl. No.: 702,497

[22] PCT Filed: Feb. 28, 1995

[86] PCT No.: PCT/FR95/00231

§ 371 Date: Aug. 27, 1996

§ 102(e) Date: Aug. 27, 1996

[87] PCT Pub. No.: WO95/23297

PCT Pub. Date: Aug. 31, 1995

[30] Foreign Application Priority Data

Feb. 28, 1994 [FR] France ................................... 94 02236

[51] Int. Cl.⁶ .................................................. H02K 7/09
[52] U.S. Cl. ..................... 310/90.5; 310/68 D; 310/68 B
[58] Field of Search ........................... 310/40 MM, 90.5, 310/68 D, 68 B

[56] References Cited

U.S. PATENT DOCUMENTS

| 3,508,444 | 4/1970 | Sitomer | 73/517 |
| 4,551,708 | 11/1985 | Welburn | 340/347 |
| 4,577,159 | 3/1986 | Pace | 330/9 |
| 5,093,754 | 3/1992 | Kawashima | 361/144 |
| 5,397,183 | 3/1995 | Lu et al. | 384/1 |
| 5,469,006 | 11/1995 | Pinkerton | 310/90.5 |
| 5,469,007 | 11/1995 | Toyama | 310/90.5 |
| 5,471,106 | 11/1995 | Curtis et al. | 310/90.5 |

FOREIGN PATENT DOCUMENTS

| 473 232 | 3/1992 | European Pat. Off. . |
| 2 322 294 | 3/1977 | France . |
| 26 56 469 | 6/1978 | Germany . |
| 39 37 687 | 5/1990 | Germany . |
| WO93/23683 | 11/1993 | WIPO | 39/6 |

Primary Examiner—Thomas M. Dougherty
Assistant Examiner—Timothy A. Williams
Attorney, Agent, or Firm—McDermott, Will & Emery

[57] ABSTRACT

An active magnetic bearing with auto position-detection includes first and second opposing electromagnets disposed on opposite sides of a ferromagnetic body (1) suspended without contract with the electromagnets. The bearing includes inductive type position detectors which are constituted directly by coils (11, 21) of the first and second electromagnets. A mechanism (14; 24) is provided for injecting a sinusoidal current $I_0$ sin$\omega$t of constant amplitude $I_0$, of angular frequency $\omega$, and of identical phase, simultaneously to the inputs of power amplifiers (13, 23) powering the coils (11, 21) of the first and second opposing electromagnets in superposition with the main currents from the servo-control circuits (31, 32). Circuits (41 to 44) serve to extract the position information which determines the magnitude of the main current to be applied by the servo-control circuits (31, 32) to the power amplifiers (13, 23) directly from the voltages $u_1$, $u_2$ across the terminals of the excitation coils (11, 21) as measured at the frequency of the sinusoidal current constituting a carrier of angular frequency $\omega$.

14 Claims, 1 Drawing Sheet

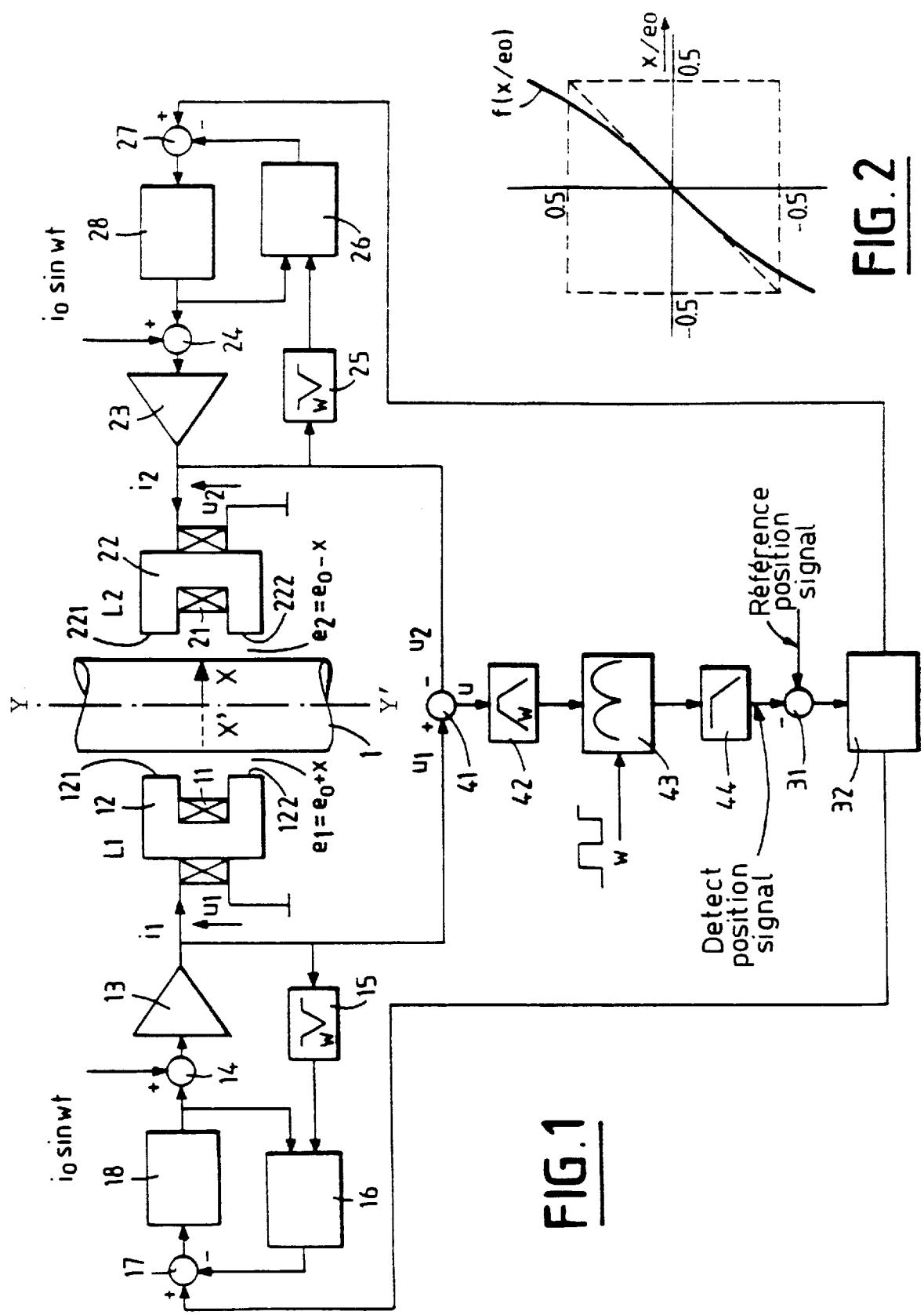

ACTIVE MAGNETIC BEARING WITH AUTO POSITION-DETECTION

BACKGROUND OF THE RELATED ART

The present invention relates to an active magnetic bearing with auto position-detection, comprising first and second opposing electromagnets disposed on either side of a ferromagnetic body suspended without contact between said electromagnets, the first and second electromagnets being oriented along an axis X'X and each comprising both a magnetic circuit defining a respective air gap $e_1$, $e_2$ with said body of mean value equal to a common predetermined value $e_0$, and secondly an excitation winding powered by a power amplifier whose input current is servo-controlled as a function of the position of the body relative to the magnetic circuits of the first and second electromagnets.

In the most widely used active magnetic bearing systems, the position of the suspended body, which body may be a machine rotor or a disk, for example, is continuously monitored by means of position detectors associated with the electromagnets of the activating bearings which produce the forces required for holding the body suspended in a given working position.

The fact of using position detectors that are distinct from the electromagnets which support the suspended body considerably increases the cost of machines, because of the detectors proper, because of the associated connection means, and because of the electronic circuits for feeding them.

Also, such detectors can be situated only to one side of the bearing, and as a result the detection point cannot be collinear relative to the reaction point. This offsetting of the detectors relative to the actuator members can induce perverse effects concerning rotor monitoring when account needs to be taken of the deformation to which the rotor is subjected during its rotation. For example the detectors may be located at deformation nodes whereas the activating electromagnets are closer to deformation anti-nodes, or vice versa. The information provided by the detectors is no longer an accurate reflection of reality at the bearings proper.

Document Patent No. WO-A-93/23683, to Rubner et al discloses a magnetic bearing with auto detection comprising, for a given direction, coils connected in series and conveying both current for stabilizing the position of the moving body suspended by the bearing and detection current. Such a magnetic bearing system nevertheless requires premagnetization of the stator which is achieved by means of permanent magnets, and also amplifiers, each capable of providing currents that are capable of alternating between being positive and negative depending on the position of the moving body. Implementing such premagnetizing means and complex linear amplifiers of the four-quadrant type makes implementation complex and affects overall reliability.

SUMMARY OF THE INVENTION

The present invention seeks to remedy the various drawbacks mentioned above and to make it possible to provide reliable servo-control of the electromagnets of an active magnetic bearing by providing information concerning the position of the suspended member in a manner that is cheap and does not require separate position detectors, such as detectors of inductive, capacitive, or optical type.

The invention seeks more particularly to make it possible to perform position detection of the inductive type in conventional active magnetic bearings while making use, in any given direction, of only two opposing electromagnets that produce attractive forces on the moving body, without it being necessary to add detection coils to the magnetic bearing distinct from the bearing's own electromagnets, and without it being necessary to add premagnetization means.

The invention seeks to enable active magnetic bearings to be made that are relatively cheap, in particular for machines that are to be produced in large quantities, such as textile spindles, for example, machining spindles, vacuum pumps, and hard disks for computers.

According to the invention, these objects are achieved by an active magnetic bearing with auto position-detection, comprising first and second opposing electromagnets disposed on either side of a ferromagnetic body suspended without contact between said electromagnets, the first and second electromagnets being oriented along an axis X'X and each comprising both a magnetic circuit defining a respective air gap with said body of mean value equal to a common predetermined value $e_0$, and secondly an excitation winding powered by a power amplifier whose input current is servo-controlled as a function of the position of the body relative to the magnetic circuits of the first and second electromagnets, the active magnetic bearing being characterized in that the power amplifiers are constituted by chopper amplifiers; in that the coils of the first and second electromagnets directly constitute position detectors of the inductive type; in that means are provided for injecting a sinusoidal current $I_0$ sin$\omega t$ of constant amplitude $I_0$, of angular frequency $\omega$, and of identical phase simultaneously to the inputs of the power amplifiers powering the coils of the first and second opposing electromagnets, in superposition with the main currents delivered by the servo-control circuits, the ratio of the detection voltage delivered by one of the amplifiers at the angular frequency $\omega$ to the voltage for providing the force exerted by the corresponding electromagnet being of the order of 5% to 20%, and preferably being close to 10%; and in that it includes circuits for extracting the position information determining the magnitude of the main current to be applied by the servo-control circuits to the power amplifiers directly from the voltages $u_1$, $u_2$ across the terminals of the excitation coils as measured at the frequency of the sinusoidal current constituting a carrier of angular frequency $\omega$.

Thus, according to the invention, in addition to performing its bearing function proper, the magnetic bearing is also used as an inductive type position detector without there being any need to add any additional coil, the voltage being measured across the terminals of each electromagnetic coil of the bearing under conditions for which the voltage is quasi-proportional to the displacement of the suspended body (the rotor).

The fact that the sinusoidal current of constant amplitude $I_0$ and of fixed angular frequency $\omega$ is injected simultaneously in both opposing electromagnets, using identical phase on both sides, avoids creating the slightest disturbing force on the rotor whenever it is in its nominal central position, particularly when the frequency of the sinusoidal current constituting the carrier must be kept low enough to avoid using up the voltage delivered by the power amplifier driving the bearing.

Under all circumstances, the active magnetic bearing is characterized in that the frequency of the injected sinusoidal current of angular frequency $\omega$ is considerably greater than the desired closed-loop passband of the servo-control circuits.

The use of chopper power amplifiers makes it possible to limit losses and to feed the coils of the bearing with very high reactive power.

Advantageously, the chopper amplifiers have a switching frequency of the order of several tens of kilohertz.

According to an important characteristic of the present invention, the voltages $u_1$, $u_2$ across the terminals of the excitation coils measured at the frequency of the sinusoidal current of angular frequency ω are compared by differential measurement in a comparator providing a voltage u proportional to the displacement of the body relative to its equilibrium position.

Differential measurement makes it possible to eliminate the two constant terms of the form $U_0=L_0 I_0 \omega$ due to the inductance $L_0$ of the electromagnetic coils and relating to the average air gap $e_0$, and the constant terms $U_s I_0 \omega$ due to the leakage inductance $L_s$ of the electromagnet coils and relating to magnetic losses.

More particularly, the circuits for extracting position information comprise a bandpass filter centered on the frequency of the sinusoidal current of angular frequency ω and presenting a half-power width adapted to the desired passband of the servo-control circuits.

The circuits for extracting position information comprise a synchronous demodulator placed at the output from the bandpass filter and controlled by the frequency of the sinewave current of angular frequency ω.

The circuits for extracting position information comprise a second-order filter for filtering out the frequency corresponding to an angular frequency 2ω created by full-wave demodulation within the synchronous demodulator.

Advantageously, the switching frequencies of the chopper power amplifiers and the frequency of the sinewave current of angular frequency ω are synchronized. This makes it possible to avoid problems of noise due to frequency beats.

The electromagnets are dimensioned in such a manner that the maximum force requested of said electromagnets is obtained for magnetic induction situated outside the saturation zone of the material used for constituting the magnetic circuits of the electromagnets.

Providing the path in the magnetic circuits of the bearing electromagnets remains negligible and remains quasi-constant regardless of the force requested of the electromagnets, measurement of the inductance of the bearing electromagnetic coils can indeed remain inversely proportional to the air gap.

The magnetic circuits of the electromagnets are made of a material whose permeability varies little as a function of magnetic induction, in particular in the operating zone of the electromagnets situated far from the saturation zones.

The servo-control circuits feeding the power amplifiers comprise a comparator comparing the position signal from the circuits for extracting position information with a reference position value, and at least circuits including a signal processing corrector network and a quiescent current linearizer.

The servo-control circuits further comprise flux regulation loops interposed between the circuits comprising a corrector network and a linearizer and the adder circuits constituting said injector means receiving said sinusoidal current $I_0$ sinωt of angular frequency ω.

In this case, by way of example, each flux regulation loop includes a stop filter centered on an angular frequency ω and receiving at its input the voltage signal output by the corresponding amplifier, a flux calculating circuit to which there are applied both the output signal from the corresponding stop filter and the output signal from a flux regulator also applied to an input of the corresponding adder circuit and a subtracter circuit which subtracts the signal from the corresponding flux calculation circuit from the signal delivered by the circuits comprising a corrector network and a linearizer, and that delivers an output signal to the input of the corresponding flux regulator circuit.

Naturally, the invention covers active magnetic bearings comprising, in particular, two active magnetic bearing systems of the above-defined type oriented along two mutually perpendicular directions XX' and YY'.

Other characteristics and advantages of the invention appear from the following description of various particular embodiments of the invention given as non-limiting examples and described with reference to the accompanying drawing, in which:

BRIEF DESCRIPTION OF THE DRAWING

FIG. 1 is a block diagram of an active magnetic bearing system of the invention incorporating a position detection system using the electromagnets of the bearing; and FIG. 2 is a curve showing the appearance of the position signal delivered by the position detection system as a function of variations in the air gaps of the electromagnets.

DETAILED DESCRIPTION OF THE PREFERRED EMBODIMENTS

In FIG. 1, there can be seen a rotor 1 suspended by two opposing bearing electromagnets oriented along an axis XX' perpendicular to the axis of the rotor 1. Each electromagnet comprises a respective magnetic circuit 12, 22 made of ferromagnetic material and having a U-shaped section with two pole pieces 121, 122; 221, 222 directed towards the rotor 1 which is itself made of ferromagnetic material or is covered in an armature of ferromagnetic material. Each of the pole pieces 121, 122 co-operates with the rotor 1 to define an air gap $e_1 = e_0 + x$ where $e_0$ represents the mean air gap when the rotor is in its equilibrium position and x represents variation in the air gap relative to the mean value $e_0$, as generated by displacement of the rotor 1 in the radial direction X'X. The pole pieces 221 and 222 are symmetrical to the pole pieces 121 and 122 about the rotor axis 1 when the rotor 1 is in its equilibrium position, such that each of the pole pieces 221, 222 co-operates with the rotor 1 to define an air gap $e_2 = e_0 - x$ where $e_0$ represents the mean air gap when the rotor 1 is in its equilibrium position and x represents variation in the air gap about the mean value $e_0$ as generated by displacement of the rotor 1 in the radial direction X'X. Thus, a positive value of x is representative of the rotor 1 moving towards the magnetic circuit 22 whereas a negative value for x is representative of the rotor 1 moving towards the magnetic circuit 12.

Each electromagnet also includes a respective excitation coil 11, 21 which is powered by a respective power amplifier 13, 23 which is preferably a current mode chopper amplifier. Each power amplifier 13 or 23 receives a main input current that enables it to provide the coils 11 or 21 with the energy required for holding the rotor 1 in its predetermined equilibrium position. The main input current comes from servo-control circuits that have themselves received information concerning the real position of the rotor and that take account of the reference position. Each amplifier 13, 23 delivers unidirectional current independently of the current delivered by the other amplifier 23, 13, with the electromagnets powered independently by the amplifiers 13, 23 being mounted in opposition and producing attraction forces on the moving body 1 on either side thereof in the direction of the axis X'X.

In order to obtain information concerning position without using a position detector distinct from the electromagnets of the bearing, adder circuits 14 and 24 serve to inject simultaneously to the inputs of the power amplifiers 13 and 23 respective sinusoidal currents of the form $I_0 \sin\omega t$ of constant amplitude $I_0$, of angular frequency $\omega$, and of identical phase, which sinewave currents are superposed on the main currents from the servo-control circuits.

The outputs from the power amplifiers 13, 23 thus inject currents $i_1$ and $i_2$ of the form: $i_1=i_2=I_0 \sin\omega t$ superposed on the currents intended to provide the carrying forces of the electromagnets.

The air gaps $e_1$ and $e_2$ between the rotor 1 and the poles 121, 122 or 221, 222 as the case may be are of the form given above, i.e.:

$$e_1=e_0+x$$

$$e_2=e_0-x$$

The inductances of the electromagnets 11, 12 or 21, 22 are respectively of the following forms:

$$L_1=L_s+L_0/(1+x/e_0)$$

$$L_2=L_s+L_0/(1-x/e_0)$$

where:

$L_s$ represents the leakage inductance of the electromagnets 11, 12 or 21, 22 relating to magnetic leaks; and $L_0$ represents the inductance of the electromagnets 11, 12 or 21, 22 relating to the mean air gap $e_0$.

The voltages $u_1$ and $u_2$ across the input terminals of the coils 11 and 21, due to the injected currents $i_1$ and $i_2$ are of the form:

$$u_1=-\omega I_0 L_1 \cos \omega t$$

$$u_2=-\omega I_0 L_2 \cos \omega t$$

When the difference between the voltages $u_1$ and $u_2$ is taken in a comparator 41, expressions are obtained of the form:

$$\begin{aligned} u = u_1 - u_2 &= -\omega I_0 \cos\omega t (L_1 - L_2) \\ &= (\omega I_0 \cos\omega t) \times 2L_0 \times (x/e_0)/(1-(x/e_0)^2) \\ &= A \times f(x/e_0) \end{aligned}$$

where:

$$A=(\omega I_0 \cos \omega t) \times 2L_0 = a\ constant$$

and $$f(x/e_0)=(x/e_0)/(1-(x/e_0)^2).$$

It can be seen that the comparison performed by differential measurement of the voltages $u_1$ and $u_2$ makes it possible to eliminate the constant terms due to the inductance $L_0$ relating to the mean air gap $e_0$ and the leakage inductance $L_0$ relating to magnetic leaks such that the resulting voltage is proportional to the displacement x of the rotor 1.

The voltage u is filtered in a low-pass filter 42 centered on a frequency corresponding to the angular frequency $\omega$, and having a half-power width adapted to the passband desired for the servo-control of the magnetic bearing system.

The voltage u is then demodulated in a synchronous demodulator 43 controlled by a frequency corresponding to the angular frequency $\omega$.

After passing through a second-order filter 44 that filters out the frequency created by full-wave demodulation, the output from the synchronous demodulator 43 provides a signal representative of the real position of the rotor along the axis X'X between the electromagnets of the bearing.

This signal is of the form:

$$u(x)=k(x/e_0)/(1-(x/e_0)^2)$$

FIG. 2 shows the linearity of the resulting position signal u(x) as a function of the ratio $x/e_0$ of rotor displacement x divided by mean air gap $e_0$.

It can be seen that this linearity is very good for the usual working range of the bearing.

It is thus possible to deduce a rotor position signal from the measured inductance of the two opposing electromagnets of the bearing without adding a detector that is distinct from the electromagnets of the bearing and without giving rise to the slightest disturbing force on the rotor so long as it is in its nominal central position, providing the injected current has the form $I_0 \sin\omega t$ and is injected simultaneously into both opposing electromagnets with identical phase on both sides, thereby enabling comparison to be performed by differential measurement.

The varying quiescent currents injected into the amplifiers are small in value compared with the servo-control currents that are designed to provide the force exerted by the electromagnets, and the corresponding rotor losses can remain extremely small.

The frequency of the injected sinusoidal current, corresponding to the angular frequency $\omega$, is considerably higher than the closed loop passband of the system, but it must nevertheless remain low enough to limit using up the voltage delivered by the power amplifiers powering the bearing.

As already mentioned above, the amplifiers 13 and 23 are advantageously constituted by chopper amplifiers of conventional type to limit losses. Such chopper amplifiers may have a switching frequency of the order of 50 kHz, for example, or which may be even higher than said value, being as much as or greater than 100 kHz. In any event, it is preferable to synchronize the switching frequencies of the amplifiers 13 and 23 with the frequency of the injected carrier of angular frequency $\omega$ in order to avoid noise problems due to beat frequencies.

By way of example, the switching frequency may be about twenty times the detection frequency corresponding to the angular frequency $\omega$, and the detection frequency may itself be about twenty times the servo-control frequency.

In general, the bearing is dimensioned in such a manner that the maximum force requested of the bearing is obtained for induction situated outside the saturation zone of the material used for the bearing, and the magnetic circuits 12 and 22 of the bearing are made of a material whose permeability varies little as a function of magnetic induction, in particular in the operating zone of the electromagnet, i.e. its saturation zone.

It will be observed that the active magnetic bearing system with auto detection does not imply any premagnetization by means of permanent magnets, thereby simplifying implementation and increasing robustness and reliability.

The position signal from the filter 44 may subsequently be used in the servo-control circuits in conventional manner, as though the signal had been obtained by means of an independent detector, but with the guarantee that the information signal corresponds exactly to the position of the electromagnets of the bearing.

The position signal can thus be compared in a comparator 31 with a position reference value, and the signal from the comparator 31 is applied to circuits 32 that may include a signal processing corrector network, e.g. of the PID (proportional-integral-differential) type and a quiescent current linearizer. The signal from the circuits 32 can then be applied with different signs to one of the inputs of each of the adder circuits 14 and 24 located at the inputs of the amplifiers 13 and 23.

Advantageously, the servo-control circuits may further include flux regulation loops interposed firstly between the circuits 32 and secondly the adder circuits 14, 24.

Each flux regulation loop may include a stop filter 15, 25 centered on an angular frequency ω and receiving the voltage signal output by the corresponding amplifier 13, 23 as its input, a flux computing circuit 16, 26 which receives both the output signal from the corresponding stop filter 15, 25 and the output signal from a flux regulator 18, 28 which is also applied to one of the inputs of the corresponding adder circuit 14, 24, and a subtracter circuit 17, 27 which subtracts the signals coming from the corresponding flux calculation circuits 16 and 26 from the signal delivered by the circuits 32, and delivers respective output signals to the inputs of the corresponding flux regulator circuits 18, 28.

The use of a flux loop that takes advantage of the output voltages from the amplifiers, i.e. the signal which is also used for detection,-provides better dynamic behavior, even with a narrow passband for the position detection system.

Naturally, it is possible to incorporate two active magnetic bearing systems of the invention, e.g. in a single radial active magnetic bearing, each of the systems comprising a pair of opposing electromagnets, with the two pairs of electromagnets being oriented along two mutually perpendicular directions XX' and YY'.

The active magnetic bearing of the invention may also be used on its own, e.g. as a coaxial bearing cooperating with the two faces of a disk. Under such circumstances, the electromagnets are rotated through 90° relative to the position shown in FIG. 1, so that the pole pieces 121, 122, 221, and 222 become parallel to the axis of the disk.

Although the present invention has been described and illustrated in detail, it should be clearly understood that the same is by way of illustration and example only and is not to be taken by way of limitation, the spirit and scope of the present invention being limited only by the terms of the appended claims.

We claim:

1. An active magnetic bearing with auto position-detection, comprising:
    first and second electromagnets disposed on opposite sides of a ferromagnetic body suspended without contact between said first and second electromagnets, the first and second electromagnets being oriented along an axis X—X' and each comprising both a respective magnetic circuit defining a respective air gap ($e_1$, $e_2$) with said body of mean value equal to a common predetermined value $e_0$, and a respective excitation winding powered by a power amplifier whose input current is controlled by servo-control circuits as a function of the position of the body relative to the magnetic circuits of the first and second electromagnets, the active magnetic bearing being characterized
    in that the power amplifiers are constituted by chopper amplifiers;
    in that each chopper amplifier delivers unidirectional current independently of the current delivered by the other amplifier;
    in that excitation windings of the first and second electromagnets directly constitute inductive position detectors;
    in that means are provided for injecting a sinusoidal current $I_0$ sinωt of constant amplitude $I_0$, of angular frequency ω, and of identical phase simultaneously to the inputs of the power amplifiers powering the excitation windings of the first and second opposing electromagnets, in superposition with the main currents delivered by the servo-control circuits, a ratio of a detection voltage delivered by one of the amplifiers at the angular frequency ω to the voltage for providing the force exerted by the corresponding electromagnet being of the order of 5% to 20%, and preferably being close to 10%; and
    in that it includes circuits for extracting the position information determining the magnitude of the main current to be applied by the servo-control circuits to the power amplifiers directly from the voltages $u_1$, $u_2$ across the terminals of the excitation windings as measured at the frequency of the sinusoidal current constituting a carrier of angular frequency ω.

2. The active magnetic bearing according to claim 1, wherein:
    the frequency of the injected sinusoidal current of angular frequency ω is considerably greater than the desired closed loop passband of the servo-control circuits.

3. The active magnetic bearing according to claim 1, wherein:
    the chopper amplifiers have a switching frequency of the order of several tens of kilohertz.

4. The active magnetic bearing according to claim 1, wherein:
    the switching frequencies of the chopper power amplifiers and the frequency of the sinusoidal current of angular frequency ω are synchronized.

5. The active magnetic bearing according to claim 1, wherein:
    the voltages $u_1$, $u_2$ across the terminals of the excitation coils measured at the frequency of the sinusoidal current of angular frequency ω are compared by differential measurement in a comparator providing a voltage proportional to the displacement of the body relative to its equilibrium position.

6. The active magnetic bearing according to claim 1, wherein:
    the circuits for extracting position information comprise a bandpass filter centered on the frequency of the sinusoidal current of angular frequency ω and presenting a half-power width adapted to the desired passband of the servo-control circuits.

7. The active magnetic bearing according to claim 6, wherein:
    the circuits for extracting position information comprise a synchronous demodulator placed at the output from the bandpass filter and controlled by the frequency of the sinewave current of angular frequency ω.

8. The magnetic bearing according to claim 7, wherein:
    the circuits for extracting position information comprise a second-order filter for filtering out the frequency corresponding to an angular frequency 2ω created by full-wave demodulation within the synchronous demodulator.

9. The active magnetic bearing according to claim 1, wherein:

the electromagnets are dimensioned in such a manner that the maximum force requested of said electromagnets is obtained for magnetic induction situated outside the saturation zone of the material used for constituting the magnetic circuits of the electromagnets.

10. The active magnetic bearing according to claim 9, wherein:

the magnetic circuits of the electromagnets are made of a material whose permeability varies little as a function of magnetic induction, in particular in the operating zone of the electromagnets situated far from the saturation zones.

11. The active magnetic bearing according to claim 1, wherein:

the servo-control circuits feeding the power amplifiers comprise a comparator comparing the position signal from the circuits for extracting position information with a reference position value, and circuits including a signal processing corrector network and a direct current linearizer.

12. The active magnetic bearing according to claim 11, wherein:

the servo-control circuits further comprise flux regulation loops interposed between the circuits comprising a corrector network and a linearizer and said injector means receiving said sinusoidal current $I_0 \sin\omega t$ of angular frequency $\omega$.

13. The active magnetic bearing according to claim 12, wherein:

each flux regulation loop includes a stop filter centered on an angular frequency $\omega$ and receiving at its input the voltage signal output by the corresponding amplifier, a flux calculating circuit to which there are applied both the output signal from the corresponding stop filter and the output signal from a flux regulator also applied to an input of the corresponding adder circuit and a subtracter circuit which subtracts the signal from the corresponding flux calculation circuit from the signal delivered by the circuits comprising a corrector network and a linearizer, and that delivers an output signal to the input of the corresponding flux regulator circuit.

14. An active magnetic bearing comprising two active magnetic bearing systems according to claim 1 and oriented along two mutually perpendicular directions X—X' and Y—Y'.

* * * * *